United States Patent Office 3,620,130
Patented Nov. 16, 1971

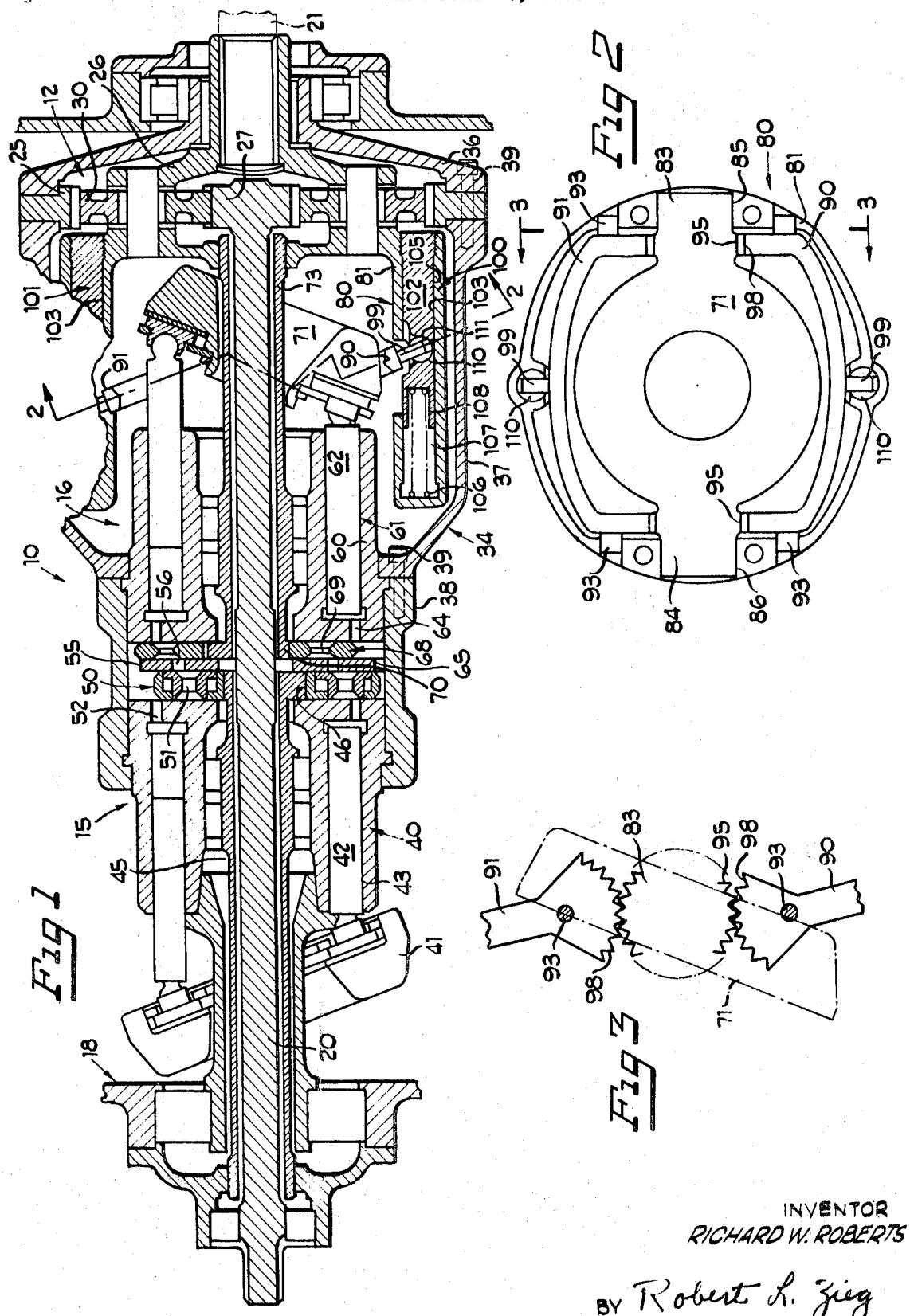

3,620,130
HYDROSTATIC TRANSMISSION MECHANISM
Richard W. Roberts, Lombard, Ill., assignor to Borg-Warner Corporation, Chicago, Ill.
Filed June 30, 1969, Ser. No. 837,594
Int. Cl. F01b *3/00, 13/04;* F16d *33/00*
U.S. Cl. 91—506                                    1 Claim

ABSTRACT OF THE DISCLOSURE

A combined mechanical and hydrostatic transmission having the sun gear of the planetary gear set driven by the input shaft the carrier of the planetary gear set driving the output shaft and a pair of hydraulic units, one of which has relatively rotating elements connected to two of the planetary gear set elements, namely, the planetary carrier and the ring gear, the other hydraulic unit being in fluid communication with the first hydraulic unit and being connected between the fixed element of the case and the ring gear. Both hydraulic units have variable displacement whereby with one of said hydraulic units being at a given displacement, and the other hydraulic unit at zero displacement the ring gear of the planetary gear set will be locked against rotation whereby the full reduction ratio of the planetary gear set is utilized and, in the situation where the said one hydraulic unit is at zero displacement, and the first hydraulic unit has a given displacement, the first hydraulic unit will lock up the planetary carrier and the ring gear to provide a 1:1 direct drive. In addition, infinitely variable speed ratios are available by having the pair of hydraulic units in various displacement positions relative to the above limits whereby a full range of speed ratios is available between the full reduction ratio of the planetary gear set and a 1:1 direct drive.

SUMMARY OF THE INVENTION

The present invention provides a combined hydrostatic and mechanical transmission having a pair of hydraulic units in conjunction with the planetary gear set in which the hydraulic power path through the hydraulic units involves relatively low horse powers such that the engine can operate at conditions to provide maximum fuel economy and still have the proper power trains or gear ratios available in accordance with the desires of the operator of the vehicle. Further, by providing a pair of hydraulic units, one of which has relatively rotating elements each connected thereby to a separate element of the gear set, provision is made for locking the gear set in a 1:1 drive ratio, and the other hydraulic unit having a fixed element and an element rotating with the ring gear of the planetary gear set, provision is thereby made for holding an element of the gear set, namely, the ring gear, stationary to provide maximum reduction ratio at the will of the operator.

DESCRIPTION OF THE DRAWINGS

FIG. 1 is a cross-sectional view through a transmission mechanism embodying the principles of the invention;

FIG. 2 is a view taken along the lines 2—2 of FIG. 1; and

FIG. 3 is a view taken along the lines 3—3 of FIG. 2.

Referring to FIG. 1, a transmission mechanism 10 is illustrated which includes a planetary gear set 12, a pair of hydraulic units 15 and 16, a fixed case 18 (shown in part only), an input shaft 20, and an output shaft 21.

The planetary gear set 12 includes an annulus gear 25, a planetary carrier element 26 and a sun gear element 27. The sun gear is drivingly connected to the input shaft, the planetary carrier element 26 is drivingly connected to the output shaft 21. A plurality of planetary pinion gears 30 are mounted on the planetary carrier 26 in the normal manner which intermesh with the sun gear 27 and the annulus gear 25. Annulus gear 25 is integral with a rotatable case 34 provided for the transmission mechanism.

The rotatable case 34 may be constructed in three-piece construction as illustrated in the drawings comprising a flange portion 36, an annular portion 37 and a support portion 38. These portions are secured together, as for example by bolts 39.

Hydraulic unit 15 comprises a cylinder barrel 40, a swash plate 41, and a plurality of pistons 42 slidable in bores 43 provided in cylinder barrel 40. Relative rotation between cylinder barrel 40 and swash plate 41 forces the pistons to follow a reciprocating path with respect to bores 43 providing the pump or motor action of the hydraulic unit in a known manner. A sleeve 45 is provided which is fixed to the fixed case 18. Mounted on this sleeve is an eccentric 46 upon which hydraulic unit 15 is rotatably journalled. The port plate 50 has a series of ports 51 therein. These ports at times communicate with ports 52 provided in cylinder barrel 40 to provide communication with hydraulic unit 16. Adjacent the port plate 50 is a separator plate 55 also having communicating ports 56 therein to provide fluid communication between the hydraulic units. The separator plate 55 is rotationally fixed with the rotatable case 34 but is, however, mounted for axial slidable movement within the rotatable case, as will be described later.

The port plate 50 is of a special type and is particularly described and illustrated in U.S. Pat. No. 3,330,556 of common assignee. This type of port plate responds to fluid pressure such that the relatively axially movable elements thereof can increase the width dimension of the port plate in response to fluid pressure to provide a sealing force against the cylinder barrel and the separator plate and the port plate for the other hydraulic unit. The port plate 50 thus functions in a unique way to maintain a sealing force.

The hydraulic unit 16 includes a cylinder barrel 60 rotatable with the rotatable casing 34 having a plurality of bores 61 having pistons 62 slidable therein. Ports 64 communicate with the bores 61. A port plate 68 is provided between cylinder barrel 60 and separator plate 65. The port plate 68 has ports 69 therein which at times communicate with ports 64 to provide fluid communication with the hydraulic unit 15. A swash plate 71 is provided for the hydraulic unit 16. A sleeve 73 is provided drivingly connected to an eccentric 70, the port plate 68 and to the planetary carrier 26. The swash plate 71 rotates with the planetary carrier 26 and thereby with the sleeve 73.

Swash plate 71 is tiltable by a tilting mechanism 80 to vary the displacement of hydraulic unit 16. The tilting mechanism 80 includes an annular body member 81 which is integral with the planetary carrier 26. The swash plate 71 as illustrated in FIG. 2 includes pilot portions 83 and 84 which are mounted in bores 85 and 86 respectively in the body 80. Also provided in the body member 81 is a pair of sector members 90 and 91. These members are separate and are pivoted in body member 81 by pins 93 on either side thereof. The sector members 90 and 91 are thus pivotable to vary the angle of swash plate 71. Provided on pilot portions 83 and 84 of the swash plate 71 are gear teeth 95. The sector members 90 and 91 include gear sectors 98 thereon having gear teeth at a fixed radius relative to the center of rotation determined by pins 93 and meshing with the gear teeth 95 of the swash plate 71. Also provided on the sector members 90 and 91 are driving pins 99.

Provided in the annular body 81 is a pair of actuators 100 and 101 adapted to change the angle of swash plate 71. Only actuator 100 is described since actuator 101 is identical. Actuator 100 includes a piston 102 slidable in bore 103. Piston 102 together with bore 103 define a fluid chamber 105 on the right end of bore 103 as viewed in FIG. 1 and a chamber 107 on the left end of bore 103 as viewed in FIG. 1. Provided in the chamber 107 is a return spring 106 engaging the piston 102. The return spring abuts the body member 81 at one end thereof and piston 102 at the other end thereof and is received in a counterbore 108 in piston 102. A cylindrical member 110 is provided mounted in the piston 102 which has a central bore 111 therein which receives driving pin 99.

When it is desired to rotate the swash plate 71 counterclockwise to change the displacement of hydraulic unit 16, fluid pressure can be introduced to chamber 105 of actuator 100 by the operator of the unit to move piston 102 to the left thereby pivoting sector member 90 about pins 93 and thereby, through the medium of sector teeth 98, 95, rotate the swash plate counterclockwise. If it is desired to move the swash plate clockwise, fluid pressure can be introduced to chamber 105 of actuator 101 to move its piston 102 to pivot sector member 91 about pins 93 and through the medium of teeth 98, 95 rotate the swash plate clockwise. As will be apparent at this time, the piston 102 of actuator 100 is returned to the right by the return spring 106, fluid pressure previously existing in chamber 105 of actuator 100 being exhausted.

The mechanism to vary the displacement of hydraulic unit 15 comprising means to rotate swash plate 41 is not illustrated in the drawings and may be of a known form to accomplish a result. It is further contemplated that a suitable control system would be used in conjunction with the transmission mechanism 10 to correlate the changes in displacement of the swash plate 71 and 41 to adjust the overall transmission gear ratio in accordance with engine or vehicle conditions as desired.

In operation the transmission mechanism 10 operates to provide an infinitely variable drive ratio between input shaft 20 and output shaft 21. The power source of the vehicle drives input shaft 20 rotating the sun gear 27. If at this time the hydraulic unit 16 is in zero displacement position and the hydraulic unit 15 is in some positive displacement position such as the one illustrated in FIG. 1, it will be seen that relative movement between the cylinder barrel and rotatable case 34 and the swash plate 41 is prevented, since there is no place for the fluid which is attempting to be pumped by unit 15 to go. Since the swash plate 41 is rotationally stationary this will then hold the rotatable case 34 and annulus gear 25 stationary and therefore the annulus gear is braked and the full designed ratio through the transmission, such as 3:1 reduction ratio for example, will be provided. This is one "lockup" condition of the two hydraulic units.

If the hydraulic units 15 and 16 are positioned such that the hydraulic unit 15 has a zero displacement and the hydraulic unit 16 has some displacement setting, in such case the hydraulic unit 16 cannot have any relative motion between the cylinder barrel 60 and the swash plate 71 since, with the hydraulic unit 15 having zero displacement, no pumping action of the hydraulic unit 16 can take place. Since the swash plate 71 is connected to the planetary carrier 26 and the cylinder barrel 60 to the annulus gear 25, the annulus gear and planetary carrier will be locked for rotation together creating a 1:1 locked-up drive ratio through the planetary gear set 12. This is the second "lockup" condition of the hydraulic units.

With the relative displacements of the hydraulic units 15 and 16 in other settings between the two limits described above, infinitely variable speed ratios can be obtained between the designed reduction ratio of the planetary gear set 12 and the 1:1 locked-up gear ratio merely by adjusting the displacements.

When the swash plates are moved beyond the lockup positions, a reverse and overdrive can be obtained. When the swash plate 71 of hydraulic unit 16 is moved through the zero displacement position the cylinder barrel 40 and annulus gear 25 rotate in the opposite direction to the sun gear 27 producing a further reduction in the speed of the output shaft 21 until zero output speed is reached and finally reverse rotation is obtained by increasing the negative displacement of swashplate 71. Similarly, when swashplate 41 is moved through the zero position the cylinder barrel 60 and annulus gear 25 rotate faster than sun gear 27 and in the same direction so that an overdrive condition can be obtained.

Since all of the power is not transmitted through the medium of the hydraulic units, the combined hydraulic pressures and flows involved when operating between the two lockup positions do not reach the levels as would be the case in a full hydrostatic type power transmission.

The hydrostatic units 15 and 16 provide a parallel power path with regard to the planetary gear set. With certain displacements of hydraulic units 15 and 16, the annulus gear 25 will rotate and drive cylinder barrels 40 and 60 such that the hydraulic unit 15 acts as a pump and hydraulic unit 16 as a motor creating a fluid drive path from annulus gear 25, hydraulic unit 15, through hydraulic unit 16 to carrier 26 and thus output shaft 21. The present transmission mechanism thus provides both mechanical and hydraulic drive paths to a single output shaft.

The present mechanism is further advantageous in that a convenient means is provided for changing the displacement of a hydraulic unit by varying the angle of the swash plate even though the swash plate rotates. This is carried out by the mechanism 80 including actuators 100 and 101 which rotates with the planetary gear set and it provides that movement of the swash plate in either direction is carried out by means of fluid pressure such that sufficient force will be available to change the angle of the swash plate. Further, by the use of the two actuators 100 and 101 at 180° displacement in the unit, a balanced condition can be maintained. Although the swash plate is a rotary unit, the weight of the member 80 and its components is equally distributed about the axis of rotation of the unit to insure a balanced condition.

With the swash plate 71 in the inclined position shown, it can be seen that a dynamic unbalance exists when the swash plate is rotated about the axis of the transmission. In the position shown, centrifugal force action on the upper and lower halves of the swash plate 71 produces a center clockwise couple. Note, however, that the inclined sectors 90 and 91 and the displaced position of the upper and lower pistons 102 introduces a clockwise couple. If the piston and sector weights are suitably proportioned relative to the swash plate weights, these two couples can be made to cancel each other and both static and dynamic balance maintained. This will remain true for all angles of inclination of the swash plate since all the masses are geared together and move proportionately.

Various features of the invention have been particularly shown and described; however, it should be obvious to one skilled in the art that modifications may be made therein without departing from the scope of the invention.

What is claimed is:

1. In a hydraulic pump or motor having a rotating swash plate, means rotating with said swash plate and actuatable to vary the angle of said swash plate, said swash plate being dynamically unbalanced when in an inclined position, said means comprising an annular element rotating with said swash plate and having a pair of fluid responsive actuators therein located generally radially outwardly of said swash plate, one of said actuators acting in response to fluid pressure to move the swash plate in a first direction to change the angle of said swash plate in response to fluid pressure, the other actuator acting in response to fluid pressure to move said swash plate in the opposite direction and return means in each said actuator imposing a force on said swash plate when fluid pressure is exhausted from said actuator, each said actuator including a fluid responsive piston having a pivotal sector member connected thereto and drivingly connected to the swash plate by means of gear teeth and said sector member pivoting in response to movement of the piston to vary the angle of said swash plate, and said actuators acting to overcome the dynamic unbalance of said swash plate when the swash plate is in an inclined position due to the radial position of said actuators with respect to said swash plate.

References Cited

UNITED STATES PATENTS

| | | | |
|---|---|---|---|
| 1,418,951 | 6/1922 | Martin | 103—162 A |
| 2,192,539 | 3/1940 | Condon | 103—162 B |
| 2,333,422 | 11/1943 | Higgins | 103—162 A |
| 3,274,947 | 9/1966 | Jonkers et al. | 103—162 |
| 3,442,181 | 5/1969 | Olderaan | 103—162 |
| 3,463,087 | 8/1969 | Grant | 103—162 |

FOREIGN PATENTS

| | | | |
|---|---|---|---|
| 998,577 | 7/1965 | Great Britain | 91—505 |

CARLTON R. CROYLE, Primary Examiner

J. J. VRABLIK, Assistant Examiner

U.S. Cl. X.R.

60—53A(Disc); 91—473